Nov. 7, 1950   R. J. KOCHENBURGER   2,529,085
CONTROL SYSTEM
Filed July 7, 1944   2 Sheets-Sheet 1

Inventor
Ralph J. Kochenburger
D. Steck
Attorney

Nov. 7, 1950 — R. J. KOCHENBURGER — 2,529,085
CONTROL SYSTEM
Filed July 7, 1944 — 2 Sheets-Sheet 2
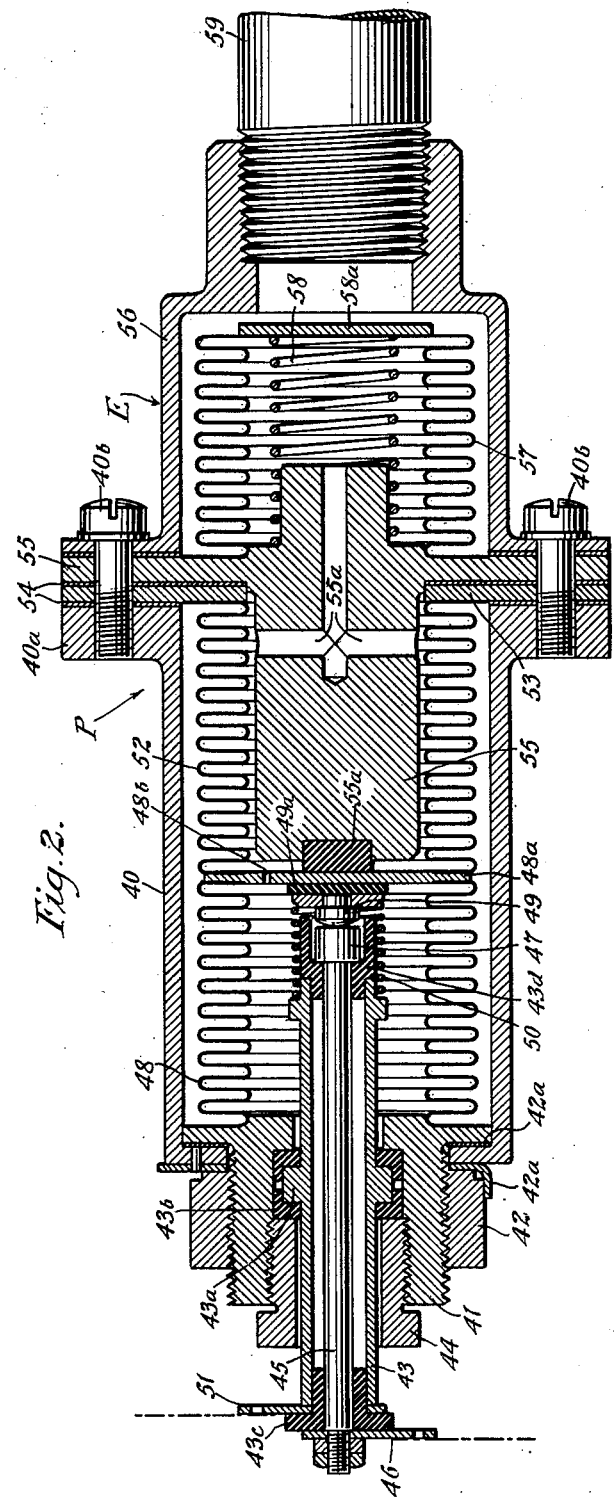
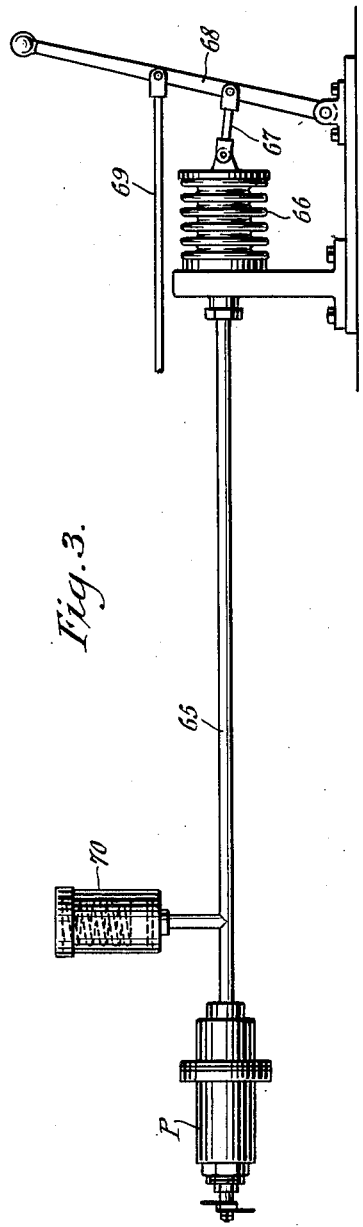
Inventor
Ralph J. Kochenburger
Attorney Patented Nov. 7, 1950

2,529,085

UNITED STATES PATENT OFFICE 2,529,085

CONTROL SYSTEM

Ralph J. Kochenburger, Montclair, N. J., assignor to Curtiss-Wright Corporation, a corporation of Delaware Application July 7, 1944, Serial No. 543,832

8 Claims. (Cl. 170—135.72)

My invention relates to a control system and, more particularly, to a control system for preventing over-speeding of a motor or an engine such, for example, as an aircraft engine.

In accordance with my invention, the speed of an aircraft engine is controlled by changing the pitch of the propeller blades driven by said engine and, in the event that the fuel supplied to said engine is abruptly and substantially increased, the pitch of the propeller blades is increased at a rate substantially greater than the normal pitch-change rate.

My invention has reference to a system wherein pitch change is initiated and continued in response to abrupt increase in manifold engine pressure or, more or less directly, in response to operation of the throttle, or otherwise as may be desirable.

Various other objects, advantages and features of my invention will become apparent from the following detailed description.

My invention resides in the control system, control features, arrangements and combinations of the character hereinafter described and claimed. For an understanding of my invention and for an illustration of some of the forms thereof, reference is to be had to the accompanying drawings, in which:

Fig. 2 is a vertical sectional view, partly in elevation, showing a part of my novel mechanism; and Fig. 3 is an elevational view illustrating features of the invention.

Figure 1:
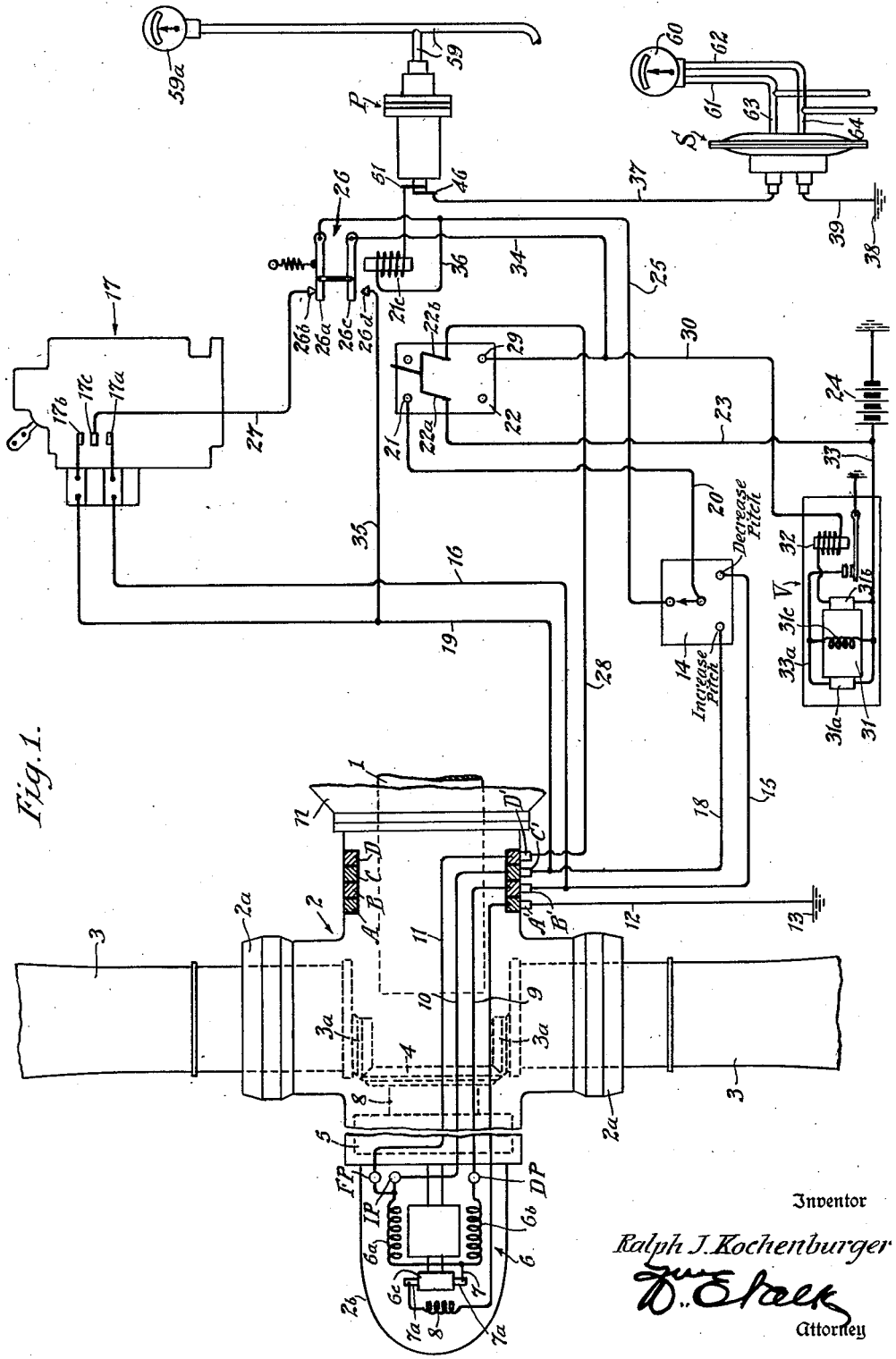
Figure 1 is a diagrammatic view illustrating the invention.

As shown by Fig. 1, the nose $n$ of an aircraft engine has projecting therefrom a propeller shaft 1 having secured thereto a hub 2 comprising sockets $2a$, $2a$ in which the respective propeller blades 3, 3 are journalled. For pitch-changing, each propeller blade 3 has an integral gear $3a$ at the shank thereof meshing with a ring gear 4 journalled in the hub 2. The ring gear 4 is driven by a speed-reducing unit, generally indicated at 5, which, in turn, is driven by a reversible electric motor, schematically shown at 6, and enclosed within a housing $2b$ suitably secured to the hub 2. Power is supplied to the motor 6 through slip rings A, B, C and D which are mounted on the hub 2 and coact with brushes A', B', C' and D', respectively.

The arrangement described herein is a diagrammatic representation of a well known form of electrically controlled pitch-changing mechanism. However, it will be understood that the invention is applicable to other types of pitch-changing systems.

Forming a part of the motor 6 are oppositely wound field coils $6a$ and $6b$ which provide when energized suitable magnetic fields to cause motor armature rotation for pitch increase or decrease respectively. The field coils $6a$ and $6b$ have a common terminal from which a conductor 7 extends to one of a set of brushes $7a$, $7a$ coactable with the commutator $6c$ of the motor 6, the other brush $7a$ being connected to a brake coil 8 which, in turn, is connected to the slip ring A. Extending from the field coil $6b$ is a conductor 9 passing through a limit stop DP to the slip ring B. Branching from the field coil $6a$ are conductors 10 and 11 which extend, respectively, through a limit stop IP to slip ring C and through a limit stop FP to slip ring D. The limit stops DP, IP and FP are normally closed switches which are opened automatically when limiting low, high and feather pitch positions, respectively, of the blades 3 are attained to thereby prevent further operation of their respective pitch-changing circuits until the blades 3 are restored to a pitch range which allows closure of the respective limit switches.

Attached to the brush A' is a conductor 12 which is grounded at 13 to comprise a common circuit return. The brush B' is connected to the "decrease pitch" terminal of a manually operable selector switch 14 by a conductor 15 from which branches a conductor 16 extending to a contact $17a$ of an automatic governor 17 as known in the art and which, for example, may be of the type disclosed in Patent No. 2,449,452 dated September 14, 1948. As hereinafter described, the governor 17 has a normal mode of operation whereby it automatically controls the motor 6 to effect the pitch-changing operation.

The brush C' is connected to the "increase pitch" terminal of selector switch 14 by a conductor 18 from which branches a conductor 19 extending to a contact $17b$ of the governor 17. Attached to the arm of selector switch 14 is a conductor 20 which is connected at contact 21 to one terminal of a double-pole double-throw feather switch 22. A conductor 23 joins an arm $22a$ of switch 22 to one terminal of a battery 24, the other terminal of which is grounded. When the arm $22a$ of switch 22 is engaged with contact 21, the switch 22 is in "normal" position.

Leading from the "automatic" terminal of selector switch 14 is a conductor 25 which is attached to the armature $26a$ of a relay generally indicated at 26, said armature $26a$ being normally closed on a contact 26b connected by a conductor 27 to a central movable contact 17c of the governor 17, the vertical position of which is dependent upon the speed of the aircraft engine.

Extending from the brush D' is a conductor 28 which is connected to an arm 22b of feather switch 22 which comprises a contact 29 from which passes a conductor 30 leading to a voltage booster V. When the arm 22b of switch 22 is in engagement with contact 29, the switch 22 is in "feather" position.

Included in the voltage booster V is a motor-generator unit 31 having a motor armature 31a, a generator armature 31b and a common field coil 31c which are operable in connection with a relay 32, the winding of which has its terminals connected to conductor 30 and to the generator armature 31b, respectively. When the winding of relay 32 is energized by closure of a load circuit supplied from the conductor 30, the relay contacts are closed with resultant energization of the motor armature 31a and the field coil 31c which are connected to the positive terminal of the battery 24 by a conductor 33 and to ground through a conductor 33a and the aforesaid contacts of relay 32. The generator armature 31b upon rotation of the motor armature which drives it, produces a voltage of the same magnitude as the battery voltage which is added to the battery voltage, thus producing substantially double the normal voltage in the conductor 30. This high voltage is used at times to operate the propeller pitch change motor 6 at high speed to attain a high rate of blade pitch increase for feathering, and for compensating sudden increases in engine power as will shortly be described.

Branching from the aforesaid conductor 30 is a conductor 34 which is connected to the armature 26c of the relay 26, said armature 26c being normally open with respect to a contact 26d which is connected to conductor 19 by a conductor 35. The terminals of the winding of the relay 26 are connected, respectively, to conductor 25 and to one contact of a power-change anticipator P, a second contact of which is secured to a conductor 37 which extends to one contact of a pressure-operated switch S, the other contact of which is grounded at 38 by a conductor 39.

The power-change anticipator P functions, as will be described later, as a normally open single-pole single-throw switch while the pressure switch S is any suitable switch which is responsive to take-off or landing of the aircraft. As herein shown, the switch S is a normally open single-pole, single-throw switch but, when connected to the pressure lines as shown, is closed during most flight conditions. With the relay 26 in the condition shown, the operation of the arrangement is similar to that of prior art systems.

Whenever a positive voltage is applied to one of the field coils 6a or 6b, current passes through the motor armature windings 6c, brake coil 8, slip ring A, brush A' and conductor 12 to ground at 13. When brake coil 8 is thus energized, a mechanical locking arrangement, not shown, is released to permit rotation of motor 6 with resultant "increased pitch" or "decreased pitch" operation of the propeller blades, depending on whether field coil 6a or field coil 6b is energized.

With the switch 22 in "normal" position, current from the positive terminal of the battery 24 is supplied to the arm of selector switch 14 through conductor 23 and conductor 20. With the switch 14 in "increased pitch" position, the current then passes through conductor 18, brush C', slip ring C and conductor 10 to the field coil 6a to cause operation of the motor 6 with resultant increase in pitch of the propeller blades. With the selector switch 14 in "decreased pitch" position, current is supplied through conductor 15, brush B' and slip ring B to the field coil 6b to cause rotation of the motor 6 in opposite direction with resultant decrease in pitch of the propeller blades. In this manner, manual pitch change of the propeller blades can be accomplished at any time desired.

It is to be understood, however, that as the propeller blades reach their limiting "increased pitch" or "decreased pitch" positions, the respective limit switches IP or DP will open to prevent further operation of the pitch-changing motor 6 until the blades are returned to their normal pitch range.

With the selector switch 14 in automatic position, current passes through conductor 25, armature 26a and its normally closed contact 26b, and conductor 27 to the central contact 17c of the automatic governor 17. When movable contact 17c engages contact 17b, current flows through conductor 19, brush C', slip rings C and conductor 10 to the field coil 6a with resultant increase in pitch of the propeller blades. When movable contact 17c engages contact 17a, current passes through conductor 16, brush B' and slip ring B to the field coil 6b with resultant decrease in pitch of the propeller blades. As previously stated, the vertical position of the movable contact 17c is dependent upon the speed of rotation of the aircraft engine and the governor 17 accordingly acts, in well understood fashion, to maintain a substantially constant speed of rotation of the aircraft engine through operation of the described pitch-changing mechanism.

If the switch 22 is moved to "feather" position, the circuit to the governor is broken and the winding of relay 32 is energized by a circuit which includes the positive terminal of battery 24, conductor 33, generator armature 31b, the winding of relay 32, conductor 30, contact 29, switch arm 22b, conductor 28, brush D', slip ring D, conductor 11, limit stop FP, field coil 6a, armature 6c, brake coil 8, slip ring A, brush A' and ground connection 13.

Responsive to the closure of this circuit, the winding of relay 32 is energized to cause engagement of its contacts with resultant operation of the motor armature 31a which drives the generator armature 31b to thereby increase the voltage passing through the last described circuit. This increased voltage causes the motor 6 to run at increased speed to thereby cause a very rapid increase in pitch or feathering of the propeller blades.

The operation of the system just described, as previously stated, is well known in the prior art. My invention resides primarily in the provision of the power-change anticipator P, the pressure switch S and the relay 26 for temporarily suspending the operation of the governor 17, the power-change anticipator P being responsive to variations in the intake manifold pressure of the aircraft engine, although, in a broader concept, the invention is not to be so limited. Alternatively, the normal mode of operation of the governor 17 may be modified for the purposes of the invention.

The power-change anticipator P comprises a casing 40, Fig. 2, having a flange to which a tubular nut 41 is secured by a threaded lock nut 42 which cooperates with the aforesaid flange and with suitable washers, as shown. Extending through the nut 41 is a sleeve 43 which is supported therein by a circumferential rib 43a encased in suitable packing 43b which is engaged by a lock nut 44 and an integral flange of the nut 41. Supported within the sleeve 43 by insulating members 43c and 43d is a rod 45 which, at one end thereof, carries a suitable contact member 46 and, at the other end thereof, has an enlarged circular contact 47.

Supported by the nut 41 and disposed within the casing 40 is a bellows 48 having an end plate 48a upon which a contact 49 is supported by an insulating strip 49a. As shown, the contact 49 is biased from the contact 47 by a helical spring 50 which engages said contact 49 and a flange of the sleeve 43. The sleeve 43 is provided further with a contact member 51 which is electrically connected with the contact 49 by the sleeve 43 and compression spring 50.

The end plate 48a supports one end of a second bellows 52, the other end thereof being secured to an annular member 53 which is spaced from a flange 40a of the casing 40 by gaskets 54. Abutting the annular member 53 is a plug 55 which extends within one end of the bellows 52 and has an integral insulating block 55a normally contacting the end plate 48a. The gaskets 54, annular member 53, plug 55 and a cap 56 are all secured to the flange 40a by screws 40b.

Attached to the plug 55 is a third bellows 57 which is urged to a desired initial position by a helical spring 58 disposed between one end of the plug 55 and a plate 58a secured to one end of said bellows 57. At its outer end, the cap 56 is threaded for the insertion of a tube 59 leading to the manifold of the aircraft engine previously referred to. As shown in Fig. 1, a meter 59a may be utilized to indicate the pressure in the tube 59. Plug 55 is provided with suitable drillings 55a which connect the interior of the bellows 57 with the interior of the bellows 52, these drillings having such size that the air pressure within the aforesaid bellows is always substantially equal while, for a purpose to be described later, the end plate 48a is provided with a small vent 48b. When the air pressure within bellows 48 and 52 is substantially equal, the end plate 48a is in such position that contact 49 is not in engagement with contact 47. The plug 55 decreases the effective volume of bellows 52 so as to obtain more complete compression of the air in said bellows 52 and bellows 57.

The operation of the device shown in Fig. 2 is as follows:

When the power output of the aforesaid aircraft engine is increased rapidly, the manifold pressure effective within the chamber E defined by the outer surface of the bellows 57 and the interior surface of the cap 56 is increased rapidly with resultant compression of bellows 57 and the air included therein. Due to the presence of the connecting passages 55a, this increase in pressure is also effective within bellows 52. Accordingly, the air pressure within bellows 52 becomes greater than the air pressure within bellows 48 causing the end plate 48a to move leftwardly against the pressure of spring 50 whereby contact 49 is moved into engagement with contact 47 to thereby form an electrical connection between contact 46 and contact 51.

Assuming that the manifold pressure remains substantially constant, air flows slowly from bellows 52 to bellows 48 through the vent 48b until the pressure within the bellows becomes substantially equal at which time the force exerted by compression spring 50 will be sufficient to cause rightward motion of the end plate 48a to its original position with the result that the electrical connection between contact 47 and contact 49 is broken.

Thus, after each rapid increase in manifold pressure there will be a period during which contact 47 engages contact 49, in response to the air pressure being greater in bellows 52 than in bellows 48, this period terminating when the air pressure within bellows 48 and 52 is substantially equalized due to the passage of air through vent 48b.

If the manifold pressure increases slowly, there is only a slight increase in air pressure within bellows 52 and enough air flows into the bellows 48 through the vent 48b to maintain a substantially equal air pressure within the aforesaid bellows with the result that contact 49 does not move leftwardly into engagement with contact 47.

If the manifold pressure decreases, bellows 57 is extended with resultant decrease in air pressure within bellows 52. In this case the air pressure within bellows 48 is greater than the air pressure within bellows 52 and the end plate 48a remains in engagement with the stop 55a with the result that contact 49 remains disengaged from contact 47.

Thus, the power-change anticipator P operates only in response to a rapid increase in manifold pressure and after each such rapid increase, there is a period during which contact 46 is electrically connected to contact 51.

As shown, the pressure switch S, Fig. 1, is operable in connection with an air speed meter 60 which has tubes 61 and 62 extending therefrom to the pitot line and static line of the aircraft, respectively, these lines being provided on most aircraft for measuring airspeed. Branching from tubes 61 and 62 are tubes 63 and 64, respectively, which extend to the pressure operated switch S. As the construction and operation of pressure switches are well known in the prior art, it is sufficient to state that, at low air speeds, the pressure switch S is open and there is no connection between conductor 37 and conductor 39 while, at flight speeds, an electrical connection is formed between the aforesaid conductors 37 and 39.

It was hereinbefore explained that, during normal operation, the switch arm 22a remains permanently in engagement with the contact 21. It was also explained that movement of the switch 22 to feather position caused energization of the winding of relay 32 whereby increased voltage was applied to the field coil 6a of the pitch-changing motor.

The relay 26 is controlled solely by the power-change anticipator P and the pressure switch S. When the latter is operated, conductors 39 and 37 are connected together and, when the power-change anticipator P is operated, the contacts 47 and 49 are engaged. When both of these devices are operated, a circuit exists from ground by way of conductor 39, the closed contacts of the switch S, conductor 37, the closed contacts 47 and 49 of the power-change anticipator P, the winding of relay 26, conductor 25, the movable arm of switch 14, conductor 20, contact 21, switch arm 22a, conductor 23, battery 24 and thence to ground. As a result of closure of the circuit just described, high voltage, as used for feathering, is applied to the increase pitch winding 6a of the motor 6 over a circuit which extends from ground by way of battery 24, conductor 33, generator armature 31b, the winding of relay 32, conductor 30, conductor 34, armature 26c of relay 26, contact 26d, conductor 35 and thence through the winding 6a and to ground over the circuit previously described for increasing the pitch of the propeller blades. As will be understood, should the contacts of either the power-change anticipator P or the switch S be opened, the circuit last described is opened with resultant deenergization of the relay 26. This restores the circuit to its normal condition so that only normal voltage can be applied to the pitch-changing motor.

Preferably, in accordance with the invention, the switch S is so adjusted that the contacts thereof are incapable of closing when the aircraft is moving at a speed lower than some selected speed, for example, 80 miles per hour. At aircraft speeds above this selected speed, the contacts of switch S remain closed at all times. Accordingly, at aircraft speeds higher than the selected speed, the control of the relay 26 resides solely in the power-anticipator P and, at speeds lower than the selected speed, the power-anticipator P is incapable of closing the circuit of the relay 26.

Accordingly, if during flight of the aircraft, the manifold pressure of the aircraft engine is abruptly and substantially increased as occasioned, for example, by quick, substantial advance of the throttle by the pilot, the power-anticipator P operates in the manner hereinbefore described to close its contacts 47, 49 with the result that the relay 26 is energized and the pitch of the propeller blades is abruptly increased at the feathering speed. Such increase in pitch of the propellers continues until (1) the relay 26 is deenergized by separation of the switch contacts 47 and 49, or (2) until said relay 26 is deenergized by separation of the contacts of the switch S, or (3) until the limit switch IP is opened.

As hereinbefore described, the power-change anticipator P is controlled in response to changes in manifold pressure of the aircraft engine. It shall be understood that the invention is not to be thus limited since the power-change anticipator P may be operated by other devices which are utilized to control the power output of the aircraft engine.

For an example of the invention as last described, reference is to be had to Fig. 3 wherein the power-change anticipator P is generally similar to the one described above. Extending from the power-change anticipator P of Fig. 3 is a tube 65, which corresponds with the tube 59 of Figs. 1 and 2, said tube 65 leading to a suitably supported bellows 66 which is connected by a rod 67 to a lever 68 having pivoted thereto a rod 69 leading to a carburetor or control mechanism, not shown, for the power supply of the aircraft engine. Hence, the lever 68 is the throttle lever and, when actuated by the pilot in a counter-clockwise direction, Fig. 3, to increase the fuel supply for the engine, the bellows 66 is automatically compressed with resultant compression of air therein, in the tube 65 and in the operating chambers of the power-change anticipator P. As the result of such movement of the lever 68, then, the contacts 47, 49 are closed and this is accompanied by change in pitch of the propeller blades at feather speed in the manner hereinbefore described.

The control system of Fig. 3 may be operated either by pneumatic or hydraulic pressure. If the operation is by hydraulic pressure, an accumulator 70 should be connected to the tube 65 so that a reservoir is provided for the hydraulic fluid as the pressure transmitted thereby increases.

In view of all the foregoing, it follows that, by my invention, the pitch of the propeller blades is quickly increased in response to sudden, substantial increase in manifold pressure of the aircraft engine or in response to a substantial and abrupt change in some other condition affecting the power output of said aircraft engine. This is done by removing the control of the pitch-changing operation from the governor (which may respond too slowly) and immediately transferring that control to the power-change anticipator P which is of the quick-response type and which develops a contact-closing pressure in its operating chambers proportional to the power which the engine is to develop responsive to the increased amount of fuel supplied thereto. As a result, the pitch of the propeller blades is increased preferably at the feather rate hereinbefore described. Therefore, harmful overspeeding of the engine is prevented.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a variable pitch propeller system, an aircraft having an engine, a propeller hub driven thereby, propeller blades journalled in said hub, means for changing the pitch of said propeller blades, means comprising a control area upon which the pressure varies in accordance with changes in the power of said engine, means initiating a period of operation of said pitch-changing means only in response to a rapid change in pressure upon said control area from any initial pressure value to thereby increase the pitch of said propeller blades, means for terminating the operation of said pitch-changing means at the end of said period, and means responsive to the speed of said aircraft for preventing the operation of said third-named means when the aircraft is moving at a relatively slow speed during landing and take-off.

2. In a control system, a prime mover, a variable load therefor having a normal rate of variation controlled by a governor and having a high rate of variation, a manifold pressure changer for said prime mover, means responsive to sudden and substantial increase in manifold pressure of said prime mover from any initial value, means actuated by said responsive means to terminate governor control, and means also actuated by said responsive means to increase said variable load at its high rate of load variation, said load increasing and governor terminating means being ineffective to alter said variable load in response to normal changes in manifold pressure.

3. In a control system, a prime mover, a variable load therefor having a normal rate of variation controlled by a governor and having a high rate of variation, a manifold pressure changer for said prime mover, means responsive to sudden and substantial increase in manifold pressure of said prime mover from any initial value, means actuated by said responsive means to terminate governor control, and means also actuated by said responsivce means to increase said variable load at its high rate of load variation, said load increasing and governor terminating means being ineffective to alter said variable load in response to normal changes in manifold pressure, and said load increasing and governor terminating means including mechanism to render it inoperative upon cessation of said sudden and substantial increase in manifold pressure.

4. In a control system in combination, a prime mover, a variable load therefor, a first means for changing said variable load at normal rate and at higher than normal rate, a governor responsive to normal changes in the operating condition of said prime mover for operating said variable load changing means at normal rate, a second means including a circuit operable in response to sudden and substantial power change of said prime mover from any initial power setting, a third means operated by said second means to operate said variable load changing means at higher than normal rate in the sense of increasing load with increasing power, and an interrupter in said circuit for rendering said second means inoperative, said interrupter being operated by a device sensitive to variations in another quantity resulting from prime mover operation.

5. In a control system in combination, a prime mover, a variable load therefor, a first means for changing said variable load at normal rate and at higher than normal rate, a governor responsive to normal changes in the operating condition of said prime mover for operating said variable load changing means at normal rate, a second means operable in response to sudden and substantial power change of said prime mover from any initial power setting, a third means operated by said second means to operate said variable load changing means at higher than normal rate in the sense of increasing load with increasing power, and mechanism operated by said third means to temporarily terminate governor control of the normal rate load change, and to restore normal rate load changing to said governor after termination of said sudden power change.

6. In aircraft in combination, a power plant comprising an engine and a variable pitch propeller driven thereby, first means for changing the pitch of the blades of said propeller at a normal rate of change and at a higher than normal rate of change, second means responsive to normal engine operation variations to change propeller blade pitch at said normal rate, a third means including an operating system responsive to abrupt and substantial power change of said engine from any initial power setting to change propeller blade pitch at said higher than normal rate in the sense of increasing load with increasing power, the operating system of said third means including mechanism, upon operation of the means, to interrupt pitch change control at said normal rate, and to restore pitch change to the normal rate upon termination of said substantial and abrupt power change, and an air speed responsive interrupter in said operating system for rendering said third means inoperative when aircraft speed is less than a selected speed.

7. In an aircraft power plant including an engine and a controllable pitch propeller driven thereby, in combination, a power plant speed responsive governor normally operable to maintain speed substantially constant by altering propeller pitch, said governor and propeller at times being so slow in response as to permit engine overspeeding beyond the governed value when abrupt and substantial increase in engine power is effected, a device responsive to abrupt and substantial engine power increase, means to effect propeller pitch increase at higher than governor controlled rate, and means responsive to operation of said device to remove control of said propeller from said governor and to impose control of said propeller on said high rate pitch increasing means to minimize propeller overspeeding.

8. In an aircraft power plant including an engine and a controllable pitch propeller driven thereby, in combination, a power plant speed responsive governor normally operable to maintain speed substantially constant by altering propeller pitch, said governor and propeller at times being so slow in response as to permit engine overspeeding beyond the governed value when abrupt and substantial increase in engine power is effected, a device responsive to abrupt and substantial engine power increase, means to effect propeller pitch increase at higher than governor controlled rate, and means responsive to operation of said device to remove control of said propeller from said governor and to impose control of said propeller on said high rate pitch increasing means to minimize propeller overspeeding, said latter means being operable to restore propeller pitch control at normal rate to said governor upon termination of said abrupt power increase.

RALPH J. KOCHENBURGER.

REFERENCES CITED

The following references are of record in the file of this patent:

UNITED STATES PATENTS

| Number | Name | Date |
|---|---|---|
| 2,128,983 | Blanchard | Sept. 16, 1938 |
| 2,187,120 | Gosslau, et al. | Jan. 16, 1940 |
| 2,195,036 | Palmer | Mar. 26, 1940 |
| 2,334,967 | Thomas, et al. | Nov. 23, 1943 |
| 2,346,007 | Chillson | Apr. 4, 1944 |
| 2,346,916 | Halford, et al. | Apr. 18, 1944 |
| 2,391,323 | Martin | Dec. 18, 1945 |
| 2,449,452 | Chillson | Sept. 14, 1948 |

FOREIGN PATENTS

| Number | Country | Date |
|---|---|---|
| 538,386 | Great Britain | July 31, 1941 |

OTHER REFERENCES

Mennesson, A. P. C. application, Serial No. 297,931, published May 18, 1943.